US010924310B2

(12) United States Patent
Toprak-Deniz et al.

(10) Patent No.: US 10,924,310 B2
(45) Date of Patent: Feb. 16, 2021

(54) TRANSMITTER WITH FULLY RE-ASSIGNABLE SEGMENTS FOR RECONFIGURABLE FFE TAPS

(71) Applicant: International Business Machines Corporation, Armonk, NY (US)

(72) Inventors: Zeynep Toprak-Deniz, Norwalk, CT (US); John F. Bulzacchelli, Somers, NY (US); Herschel A. Ainspan, New Hempstead, NY (US); Jonathan E. Proesel, Mount Vernon, NY (US); Mounir Meghelli, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/277,392

(22) Filed: Feb. 15, 2019

(65) Prior Publication Data
US 2020/0084074 A1    Mar. 12, 2020

Related U.S. Application Data

(60) Provisional application No. 62/728,998, filed on Sep. 10, 2018.

(51) Int. Cl.
*H04L 27/01* (2006.01)
(52) U.S. Cl.
CPC .................................. *H04L 27/01* (2013.01)
(58) Field of Classification Search
CPC ....................................................... H04L 27/01
See application file for complete search history.

(56) References Cited

U.S. PATENT DOCUMENTS 9,467,312 B2* 10/2016 Ganzerli ........... H04L 25/03146
10,284,363 B2* 5/2019 Dickson ................ H04L 7/0338
(Continued)

OTHER PUBLICATIONS

Steffan, G., et al., "A 64Gb/s PAM-4 Transmitter with 4-Tap FFE and 2.26pJ/b Energy Efficiency in 28nm CMOS FDSOI," 2017 IEEE International Solid-State Circuits Conference (ISSCC 2017), Session 6, Ultra-High-Speed Wireline, 6.4, Feb. 6, 2017, pp. 116-117.

(Continued)

*Primary Examiner* — Freshteh N Aghdam
(74) *Attorney, Agent, or Firm* — Scully, Scott, Murphy & Presser, P.C.; Daniel P. Morris, Esq.

(57) ABSTRACT

Methods and systems of performing feed forward equalization (FFE) on data streams are described. A circuitry may generate staggered data streams from data streams of an input signal. The staggered data streams may include data in staggered unit intervals. The circuitry may include a plurality of segments. A segment may define a specific unit interval to carve the staggered data streams into one unit interval pulses positioned at the specific unit interval. The specific unit interval to carve the staggered data streams may indicate an assignment of the segment as one of a FFE pre tap, a FFE main tap, and a FFE post tap. The plurality of segments may be assigned to different FFE taps based on different clock signal selection defining different unit intervals to perform the carving. The plurality of segments may output respective one unit interval pulses to reproduce the input signal.

20 Claims, 6 Drawing Sheets

(56) References Cited

U.S. PATENT DOCUMENTS

| | | | |
|---|---|---|---|
| 2008/0240212 A1* | 10/2008 | Satou | H04L 1/24 375/221 |
| 2015/0195108 A1 | 7/2015 | Prokop et al. | |
| 2016/0105298 A1 | 4/2016 | Kim | |
| 2018/0337806 A1* | 11/2018 | Farjad-Rad | H04L 25/03019 |
| 2019/0326894 A1 | 10/2019 | Kadkol et al. | |

OTHER PUBLICATIONS

Frans, Y., et al., "A 40-to-64Gb/s NRZ Transmitter with Supply-Regulated Front-End in 16nm FinFET," 2016 IEEE International Solid-State Circuits Conference (ISSCC 2016), Session 3, Ultra-High-Speed Transceivers, 3.7, Feb. 1, 2016, pp. 68-69.

Kim, J, et al., "A 112Gb/s PAM-4 Transmitters with 3-Tap FFE in 10nm CMOS," 2018 IEEE International Solid-State Circuits Conference (ISSCC 2018), Session 6, Ultra-High-Speed Wireline, 6.1, pp. 102-103, Feb. 12, 2018.

Tan, K. et al., "A 112-Gb/s PAM4 Transmitter in 16nm FinFET," 2018 Symposium on VLSI Circuits Digest of Technical Papers, Jun. 19, 2018, pp. 45-46.

Menolfi, C., et al., "A 112Gb/s 2.6pJ/b 8-Tap FFE PAM-4 SST TX in 14nm CMOS," 2018 IEEE International Solid-State Circuits Conference (ISSCC 2018), Session 6, Ulta-High-Speed Wireline, 6.2, Feb. 12, 2018, pp. 104-105.

* cited by examiner

TRANSMITTER WITH FULLY RE-ASSIGNABLE SEGMENTS FOR RECONFIGURABLE FFE TAPS

STATEMENT REGARDING FEDERALLY SPONSORED RESEARCH OR DEVELOPMENT

This invention was made with Government support under Contract No.: B621073 awarded by Department of Energy. The Government has certain rights in this invention.

BACKGROUND

The present application relates generally to equalization architectures and data transmission systems, and more particularly to configurable feed-forward equalization architectures.

A feed-forward equalizer (FFE) is utilized to preserve an original waveform of a signal being transmitted through a communication channel. For example, a FFE may be implemented in devices such as a transmitter, a receiver, or transceiver, to eliminate pre-cursor and post cursor distortions of the signal being transmitted through the device. FFE taps may be selected and/or adjusted to generate a filter corresponding to the communication channel, where the generated filter is applied to the signal to eliminate pre-cursor and post-cursor distortions.

SUMMARY

In some examples, a circuitry operable to perform feed forward equalization on a data stream is generally described. The circuitry may provide a delay generator operable to receive a data stream. The delay generator may be operable to generate a staggered data stream based on the received data stream. Data among the staggered data stream may be positioned at staggered unit intervals. The circuitry may further provide a plurality of segments coupled to the delay generator. A segment may provide a pulse generator operable to receive the staggered data stream from the delay generator. The pulse generator may be operable to carve the staggered data stream into one unit interval pulses at a specific unit interval. The specific unit interval may indicate an assignment of the corresponding segment as one of a feed forward equalization (FFE) pre tap, a FFE main tap, and a FFE post tap. The segment may further provide a phase selector coupled to the pulse generator. The phase selector may be operable to define the specific unit interval. The segment may further provide an output circuit operable to output the one unit interval pulses carved from the staggered data stream in accordance with the specific unit interval.

In some examples, a data transmission system is generally described. The data transmission system may include a clock generator operable to generate a plurality of clock signals of different phases. The data transmission system may further include a circuitry, where the circuitry may provide a delay generator coupled to the clock generator. The delay generator may be operable to receive a data stream. The delay generator may be operable to generate a staggered data stream based on the received data stream. Data among the staggered data stream may be positioned at staggered unit intervals. The circuitry may further provide a plurality of segments coupled to the delay generator. A segment may provide a pulse generator operable to receive the staggered data stream from the delay generator. The pulse generator may be operable to carve the staggered data stream into one unit interval pulses at a specific unit interval. The specific unit interval may indicate an assignment of the corresponding segment as one of a feed forward equalization (FFE) pre tap, a FFE main tap, and a FFE post tap. The segment may further provide a phase selector coupled to the clock generator and the pulse generator. The phase selector may be operable to select a pair of clock signals generated by the clock generator to define the specific unit interval. The segment may further provide an output circuit operable to output the one unit interval pulses carved from the staggered data stream in accordance with the specific unit interval.

In some examples, a method of performing feed forward equalization on a data stream is generally described. The method may include receiving a data stream. The method may further include generating a staggered data stream based on the received data stream. Data among the staggered data stream may be positioned at staggered unit intervals. The method may further include inputting the staggered data stream into a plurality of segments. The method may further include selecting a plurality of clock signals. The method may further include carving the staggered data stream into one unit interval pulses at respective specific unit intervals. The specific unit interval to carve the staggered data stream may indicate an assignment of the corresponding segment as one of a feed forward equalization (FFE) pre tap, a FFE main tap, and a FFE post tap. The specific unit interval to carve the staggered data stream may be based on the selected clock signals. The method may further include outputting the one unit interval pulses carved from the staggered data stream from the plurality of segments.

DETAILED DESCRIPTION

In data communications, wireline circuits may operate at data rates in the range of, for example, 50-100 Gb/s to satisfy an increase in bandwidth demands. Pulse-Amplitude Modulation 4-Level (PAM-4) signaling may be used at these data rates to improve spectral efficiency. PAM-4's tolerance to residual inter symbol interference (ISI) and noise may require high precision equalization and high transmission amplitude when compared to Non-Return-to-Zero (NRZ) approaches. A transmitter configured with dedicated tap sizings may underutilize FFE taps (i.e., has small weight), and the FFE taps may not contribute much to the current delivered, but its full capacitive load remains present at the output node.

Figure 1:
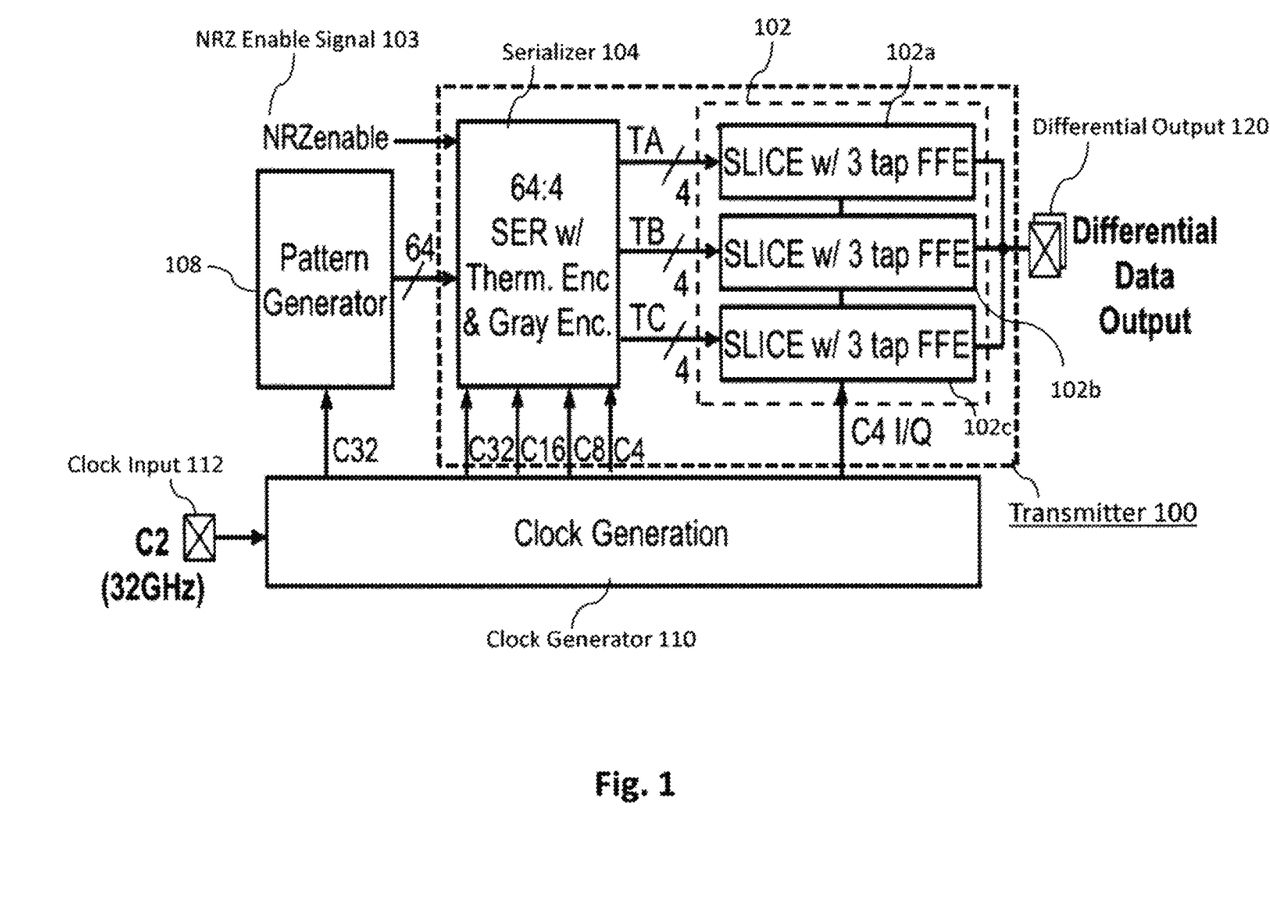
FIG. 1 is a block diagram illustrating a transmitter with fully re-assignable segments for reconfigurable FFE taps in one embodiment.

FIG. 1 is a block diagram illustrating a transmitter 100 with fully re-assignable segments for reconfigurable FFE taps in one embodiment. The transmitter 100 may include a plurality of slices (or driver slices) 102. The slice 102 may include or provide a plurality of re-assignable segments. Re-assignable segments may include circuitry, which may be the same among the segments (e.g., described below). In the example shown in FIG. 1, the transmitter 100 may provide or include three slices 102a, 102b, 102c. In one embodiment, a slice, e.g., 102a, may provide or include the same circuitry as another slice, e.g., 102b. For instance, the three slices may include the same circuitry. In an example embodiment, the slices 102a, 102b, 102c may be collectively implemented to perform feed forward equalization on an incoming data stream or bit stream. Although three slices are illustrated in the example shown in FIG. 1, additional slices may be added to configure the transmitter 100 to output signals of additional levels, such as PAM-8 signals. In some examples, additional slices may include additional circuitry implemented in the transmitter 100. For example, three slices may be implemented to process PAM-4 signals, and the three slices may process portions of the PAM-4 signal, such as different intervals between consecutive level symbols of the PAM-4 signal. Thus, the slices 102 may output three sets of 2 level signals, and the outputs from the slices 102 may be combined to form a 4-level signal.

A segment of a slice 102 has a programmable range of delay which allows it to be re-assignable to any FFE tap or cursor (pre, main, post). For instance, each segment of a slice 102 can have a programmable range of delay. The number of segments assigned to a given tap may represent a coarse tap weight setting of the assigned tap. The coarse tap weight setting may define a resolution of a signal cursor, which corresponds to a FFE tap, being outputted by the slice. To be described in more detail below, drive current of a segment may be fine-tuned to achieve desired tap weight resolution, and a combination of coarse-fine tuning of tap weights may be provided. Other refinements provided by the architecture described in accordance with the present disclosure may include usage of clock phase selector to implement FFE tap generation, intelligent assignment of segments to compensate mismatch, and tailless current mode logic (CML) approach to enhance driver bandwidth.

In some embodiments, the transmitter 100 may be a reconfigurable transmitter that implements a combined coarse-fine adjustment of FFE tap weights to improve FFE resolution with reduced power consumption. For instance, the re-assignable segment in a slice 102 of the transmitter 100 provides flexibility in setting a coarse tap weight setting with minimal hardware overhead. Any of the available segments of the slices 102 can be configured as any of the FFE taps (e.g., pre/main/post). Consequently, all segments of the slices 102 remain active with different tap configurations, thus maintaining constant peak power and efficient use of transistor sizing without any extra parasitics. In addition to the selection of number of segments for a given FFE tap (coarse tap weight setting), an op-amp based bias voltage generation (described below) for final driver segment is introduced to fine tune the FFE tap weights (described below). As a result of combined coarse-fine control, the transmitter 100 may provide a feature to efficiently adjust tap weight settings of a FFE.

In some examples, the transmitter 100 may be a 64 Gbaud quarter-rate transmitter including fully reconfigurable segments, which allows for different combinations of pre- and post-cursor taps. The transmitter 100 may be implemented in 14 nm CMOS FinFET technology and fully characterized. In the example shown in FIG. 1, a pattern generator 108 may be connected to the transmitter 100 to provide input data or input signals to the transmitter 100. The pattern generator 108 may generate data or bit streams up to 64-bits wide. In some examples, the pattern generator 108 may be connected to the transmitter 100 to facilitate a test of the transmitter 100. The transmitter 100 may be configured to receive data streams or bit streams of up to 64-bits wide as input data. The transmitter 100 may include a serializer 104, where the serializer 104 may be a 64:4 serializer or multiplexer (MUX) configured to convert the input data stream to a thermometer encoded data stream or bit stream. The serializer 104 may be configured to perform thermometer encoding and/or gray encoding on input data received at the transmitter 100. The serializer 104 may include a not-return-to-zero (NRZ) enable pin (e.g., a pin-out, or a connector), where a receipt of a NRZ enable signal 103 at the NRZ enable pin may cause the serializer 104 to convert input signals into a data stream representing NRZ or two-level pulse-amplitude modulation (PAM-2) data. The serializer 104 may perform the thermometer encoding to route the input data as multiple data streams to representing four-level pulse-amplitude modulation (PAM-4) data. Thus, the serializer 104 may be configured to route either PAM-2 or PAM-4 data to slices 102. In an example, the activation of the NRZ mode based on the receipt of the NRZ enable signal 103 may activate one slice among the slices 102 to process data in NRZ format. These example embodiments allow the one slice to perform feed forward equalization on a data stream in NRZ format and reproduce the data stream with, for example, a reduced amplitude when compared with implementations where all three slices are enabled. In another example, the activation of the NRZ mode based on the receipt of the NRZ enable signal 103 may activate more than one slice among the slices 102 to process data in NRZ format and to increase an amplitude of the data being processed. For example, the transmitter 100 may be configured to process NRZ data (e.g., NRZ enable signal 103 received) and the serializer 104 may route the same NRZ data to three slices 102a, 102b, 102c. All three slices 102a, 102b, 102c may process the same NRZ data and the data outputted by the three slices may be combined to reproduce the NRZ data with an amplitude three times the amplitude outputted by one activated slice.

In an example embodiment, the serializer 104 may include multiple levels of 2:1 multiplexers and binary-to-thermometer encoders to perform serialization on the input data stream. For example, the input data stream may be a 64-bit wide data stream, with each 64-bit word representing 32 pieces of 2-bit wide data, at a data rate equal to 1/32 of the transmitter output baud rate. The serializer 104 may convert the input data stream to quarter rate (1/4 of the transmitter output baud rate), 12-bit wide, data stream represented in thermometer code format. In an example, the serializer 104 may convert the input data stream into 32-bit wide data stream at a first level of multiplexing, convert the 32-bit wide data stream into 16-bit wide data stream at a second level of multiplexing, convert the 16-bit wide data stream into 8-bit data at a third level of multiplexing, and input the 8-bit wide data stream into a binary-to-thermometer encoder to convert the 8-bit wide data stream into thermometer code. Thus, the serializer 104 may output 4-bit wide thermometer encoded data streams TA, TB, TC. The serializer 104 may route TA, TB, TC into the three slices 102a, 102b, 102c. The data streams TA, TB, TC, may be serialized within the three slices 102a, 102b, 102c and combined to form a 4-level signal. One or more serializers with other number of levels and types of multiplexers may also be implemented. For example, the transmitter 100 may implement a 128:4 serializer with four multiplexing levels, or two copies of 64:2 serializers with three multiplexing levels in each copy, to process transmission of 128-bit wide data streams.

In some examples, a clock generator 110 may be connected to the transmitter 100. In some examples, the transmitter 100 may include the clock generator 110. The clock generator 110 may be configured to generate clock signals of different frequencies and/or phases. In an example, the clock generator 110 may receive a clock input 112 that may be a 32 GHz half-rate clock signal. To be described in more detail below, the clock generator 110 may include circuitry operable to divide the clock input 112 into a plurality of clock signals, such as the clock signals labeled as C4I, C4Q, C8, C16, C32 shown in the example in FIG. 1. The clock signals generated by the clock generator 110 may be inputted into the serializer 104 to implement the data conversions being performed by the serializer 104, and may be inputted into the slices 102 to facilitate phase selection (described below), pulse generation (described below), and other operations being performed by slices 102 and/or corresponding segments. In examples where the pattern generator 108 is connected to the transmitter 100, the clock generator may also send clock signals to the pattern generator 108 to facilitate operations of the pattern generator 108.

To be described in more detail below, a slice 102 may include a tap delay generator to retime the data received from the serializer 104 and output 4-Unit Interval (UI) wide staggered data, at quarter-rate, to all segments of the slice. The unit interval may represent the minimum time interval between condition changes of a data transmission signal, or a time duration that is occupied by a pulse within a data stream. The staggered data may be inputted to N segments within the slice, where the N segments may include the same circuitry. A segment may include a quadrature clock (C4) phase selector, a 1-UI wide pulse generator, a tailless Current-Mode Logic (CML) driver and 4:1 MUX/pre-driver. The slice 102 may include N segments, and the 1-UI wide pulse generator of the N segments may carve the staggered data into 1-UI pulses at a specific UI position by performing an AND operation on the staggered data with clock signals selected by the C4 phase selector. The 1-UI wide pulses may be converted to full-rate data using the 4:1 MUX/pre-driver. The C4 phase selector may input phase selection signals to the 1-UI wide pulse generator to define the specific UI position to perform the carving, in order to assign one or more segments to different FFE taps. For example, a segment may be reconfigured as a pre or post cursor by changing the C4 clock phase selection so that the carving of 1-UI wide pulse is shifted left or right among different UI positions. In some examples, since the staggered data are quarter rate data, the segments may carve the 1-UI wide pulses at four possible UI positions, which may result in an implementation of 4-tap FFE. In some examples, carving of the staggered data may be restricted to three out of the possible four UI positions in order to satisfy particular timing constraints without addition of complex delay compensation circuitry in the transmitter 100. The segment may output a weighted data or bit stream that may be a reproduced or recovered version of the 4-bit wide data stream (TA, TB, or TC) received at the tap delay generator. For example, segments of slice 102a may output a reproduced version of TA, where the reproduced version is generated based on the assignment of segments within the slice 102a and adjustment of weights for the segments, which will be further described below. In some examples, the outputs from the slices 102 may form differential outputs 120, where the differential outputs 120 may be combined to reproduce a PAM-4 signal to be inputted into a communication channel to facilitate PAM-4 signal transmission. In examples where the transmitter is enabled to process data in NRZ mode, the outputs from slices may be substantially identical such that when the outputs from the slices are combined, the data stream outputted by the transmitter may have an increased amplitude (e.g., triple the amplitude if three slices were used to process the same NRZ data).

Consequently, all segments may remain active with different tap configurations, thus maintaining constant peak power and efficient use of transistor sizing without any extra parasitics. Further, bias voltage of the cascode transistor in driver can be used to fine tune the FFE tap weights in addition to adjusting the coarse tap weight settings (e.g., number of segments assigned for each pre, main, and post tap). In an example, an implementation of the transmitter 100 results in tap resolution and range of $n \times 200$ $uV_{ppd}$, $n \times 25.6$ $mV_{ppd}$ respectively, where n is the number of segments assigned to a given tap. Further, an implementation of the transmitter 100 may result in a power efficiency of 1.3 pJ/b in PAM-4 mode and 2.7 pJ/b in NRZ mode for a differential output swing of $1V_{ppd}$.

Figure 2:
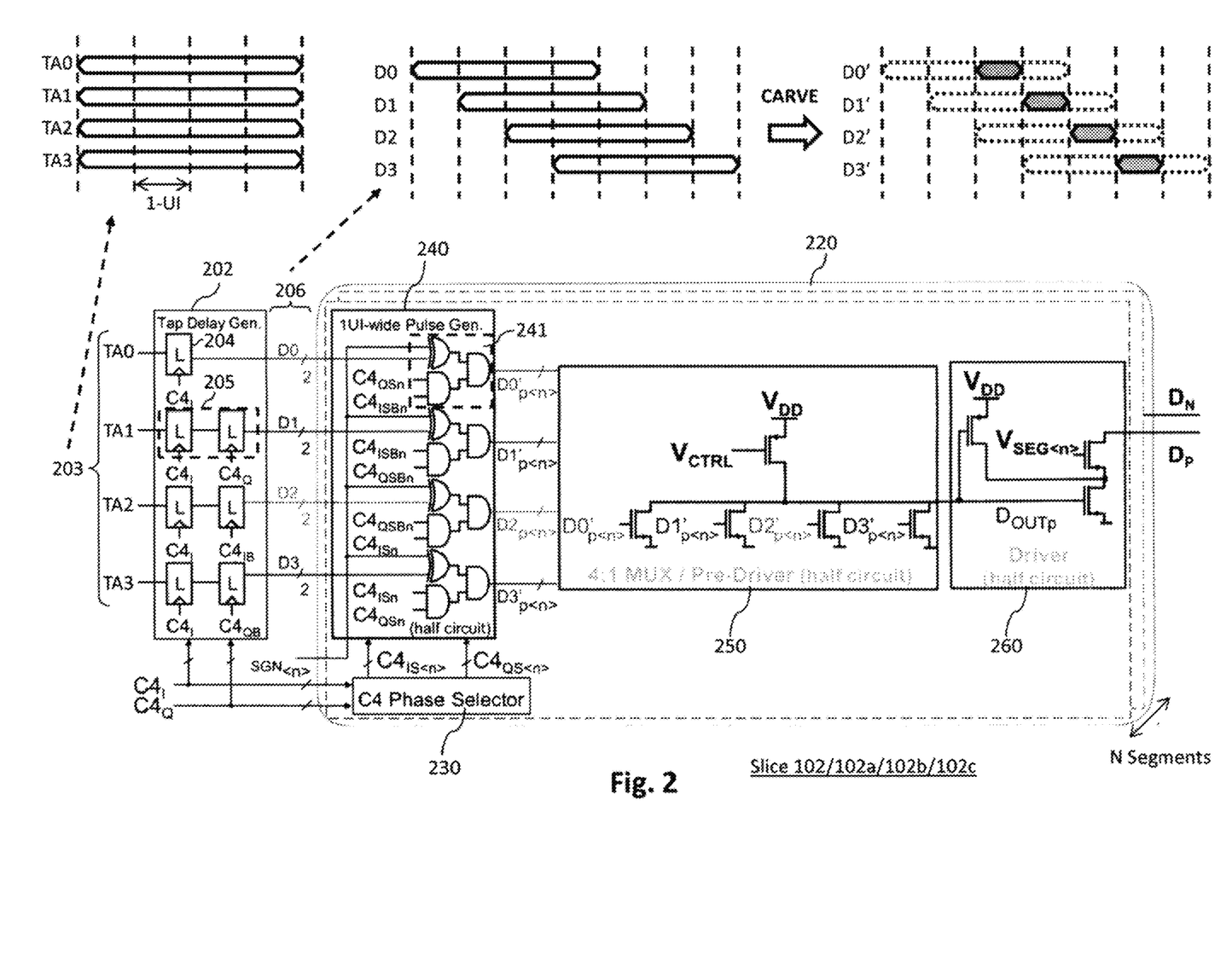
FIG. 2 is a block diagram illustrating a slice of a transmitter with fully re-assignable segments for reconfigurable FFE taps in one embodiment.

FIG. 2 is a block diagram illustrating a slice of a transmitter with fully re-assignable segments for reconfigurable FFE taps in one embodiment. FIG. 2 may include components that are labeled identically to components of FIG. 1, which will not be described again for the purposes of clarity. The description of FIG. 2 may reference at least some of the components of FIG. 1.

The slice 102 may include a delay generator 202 and N segments 220. A segment 220 may include or provide a phase selector 230, a pulse generator 240, a pre-driver circuit 250 (which may be a 4:1 multiplexer), and a driver circuit 260 (which may be a tailless Current-Mode Logic (CML) driver). The segment 220 may have a programmable range of delay which allows the segment 220 to be assigned to any FFE tap or cursor (pre, main, post). The number of segments assigned to a given tap in the slice 102 may represent the coarse tap weight setting. For example, if a slice includes 12 segments (N=12), then eight segments may be assigned as the main tap, two segments may be assigned as the pre tap, and two segments may be assigned as the post tap. A number of segments in a slice, or a value of N, may be based on a desired implementation of the transmitter 100. For example, an increasing number of segments may provide greater resolution but may penalize the device size and interconnect requirements. In another example, a decreasing number of segments may optimize device size and interconnect, but may penalize the flexibility to assign or allocate different number of segments to different taps (less combinations). In some examples, any number of segments may be assigned to any number of pre or post FFE taps. For example, among the 12 segments, 1 segment may be assigned to a first FFE pre tap, 2 segments may be assigned to a second FFE pre tap, 6 segments may be assigned as the FFE main tap, and 3 segments may be assigned as the FFE post tap. The number of segments to assign to the FFE taps, and the number of FFE taps to be assigned with respective number of segments, may be based on a desired implementation of the transmitter 100.

In some example embodiments, the transmitter 100 may implement an intelligent assignment of segments to compensate mismatches by reassigning or reallocating the segments to different taps. For example, all 12 segments of a slice may be assigned to a main tap to maximize a coarse tap weight setting of the main cursor. An iterative approach may be used to determine an optimal number of segments to be assigned to the pre and post taps by reallocating the 12 segments of the slice assigned to the main tap. The segments may be reallocated, such as assigning one segment as pre tap, one segment as post tap, and maintaining 10 segments as the main tap (e.g., remove 2 segments from main, and distribute to pre and post tap). If a result of this reallocation is not desirable, such as significant amount of distortion is still present, the segments may be reallocated again to, for example, maintaining 8 segments as the main tap, allocating two segments as pre tap, and allocating two segments as post taps. In an example embodiment, all slices 102 may have the same assignment of segments to different taps. For example, slices 102a, 102b, 102c may each have 8 segments assigned to a main tap, 2 segments assigned to a pre tap, and 2 segments assigned to a post tap.

In an example, the transmitter 100 may undergo a wafer probing test, wherein two test chip variants may be created—one with ESD & T-coil and one without ESD & T-coil. Such test may provide observations on the effects on driver performance of the transmitter 100. In an example test configuration, one FFE pre tap and one FFE post tap are assigned with segments of the transmitter 100 for both test chips. At a nominal supply of $0.95/1.2V_{DD}/V_{DDRV}$, the transmitter 100 including the 64:4 serializer (serializer 104), the clock generator 110, and the three slices 102, may consume 170 mW (1.3 pJ/b) with 128 Gb/s PAM-4 signaling. Peak-to-peak differential launch amplitude for these measurements is 1V. The total losses at half baud frequency, derived from measured step response, are 6.0 dB for the chip without ESD and 7.1 dB for the chip with ESD. The loss difference at half baud frequency with and without ESD is 1.1 dB but relatively higher at most other frequencies, thus the difference in ISI may be significant. Approximately 5 dB of this loss is due to connectors, cables, and the 60 GHz sampling scope head. The relative level mismatch (RLM) is >98.6% after optimizing segment assignments. After equalization, the total peak-to-peak jitter is less than 4 ps for 64 Gb/s NRZ eyes. 128 Gb/s performance is significantly degraded by the ESD despite the use of a compensation T-coil but may be improved by adopting a lower capacitance ESD structure at a reduced level of protection. The test chip was also measured with 112 Gb/s PAM-4 signaling at a $0.6V_{ppd}$ launch amplitude and reduced supply of $0.85/0.9V$ $V_{DD}/V_{DDRV}$. Under these conditions, the power efficiency is 1.0 pJ/bit and the measured RLM is 99%. Compared with recently reported PAM-4 transmitters operating above 64 Gb/s, this work achieves the highest data rate as well as the best energy efficiency. In some examples, an active area of the test chip with ESD is 165 μm×294 μm.

The delay generator 202 may receive a data stream 203, which may be quarter rate data including pulses TA0, TA1, TA2, TA3, from serializer 104 (shown in FIG. 1). The data stream 203 may be transmitted at quarter data rate, or four signals per clock cycle. The pulses TA0, TA1, TA2, TA3 may be 4-UI wide pulses. The delay generator 202 may include or provide one or more latches 204. The latches 204 may form one or more shift registers 205. The delay generator 202 may be operable to retime the signals among the data stream 203 by inputting pulses TA0, TA1, TA2, TA3 into respective components of the tap delay generator 202. For example, TA0 may be inputted into the latch 204 driven by a clock signal $C4_I$ generated by a clock generator (described below), to output a pulse D0. TA1 may be inputted into the shift register 205, which may be driven by clock signals $C4_I$ and $C4_Q$, to output a pulse D1. TA2 may be inputted into a shift register 205 that may be driven by clock signals $C4_I$ and $C4_{IB}$, to output a pulse D2. TA3 may be inputted into the shift register that may be driven by clock signals $C4_I$ and $C4_{QB}$, to output a pulse D3. The pulses D0, D1, D2, D3 may be outputted from the delay generator 202 as staggered data 206. Staggered data 206 may be quarter rate data and may include pulses D0, D1, D2, D3 in staggered or delayed positions (shown in an example in FIG. 2). The pulses D0, D1, D2, D3 may be 4-UI wide pulses. As a result of the staggering, the pulses D0, D1, D2, D3, may be transmitted to the pulse generator 240 in sequence and via respective lines. The staggered data 206 may be a retimed or time-shifted version of the quarter rate data 203. The delay generator 202 may output and transmit the staggered data 206 to pulse generator 240 of the N segments of the slice 102. If the slice 102 includes 12 segments, the delay generator 202 may transmit the staggered data 206 to all 12 segments of the slice 102.

A segment 220 may include or provide a phase selector 230 and a pulse generator 240. The phase selector 230 may be driven by the clock signals $C4_I$ and $C4_Q$ generated by a clock generator (described below). Details and circuitry of the phase selector 230 will be further described below. The pulse generator 240 may be configured to generate 1-UI pulses D0', D1', D2', D3' by carving the 4-UI wide data or the staggered data 206 into 1-UI wide pulses. The pulse generator 240 may carve the staggered data stream 206 at a specific UI based on the selected $C4_{IS}$ and $C4_{QS}$ phases selected by the C4 phase selector 230 (described below). By carving the staggered data stream at the specific UI, the pulse generator 240 may position the 1-UI pulses at a UI that corresponds to one of a pre tap, a main tap, and a post tap. Thus, the position of the carved pulses D0', D1', D2', D3' with respect to the 4-UI wide data D0, D1, D2, D3, respectively, may correspond to an assignment of the corresponding segment as a pre tap, main tap, or post tap. For example, a segment may be configured as a pre or post cursor by changing the phase selection signal to shift the 1-UI pulses to different UIs. As such, the segments 220 may be reconfigured as pre, post, or main tap interchangeably. Further, by being able to shift the 1-UI pulses to different UIs, a slice may be configured to implement more than one pre cursors or post cursors.

The pulse generator 240 may include or provide a plurality of circuits 241, where each circuit 241 receives a respective pulse among staggered data 206, two clock signals of different phases, and a sign signal labeled as $SGN_{<n>}$, as inputs. The sign signal is a signal that may change a polarity of data being inputted into the pulse generator 240, such as D0, D1, D2, D3. The sign signal and a 4-UI wide data (e.g., D0, D1, D2, D3) may be inputted into a XOR gate of circuit 241, such that the XOR gate may change a polarity (positive or negative) of the staggered data. For example, if D0 is 0 and the sign signal is 0, the output is 0 and no changes are made to the polarity of D0. However, if D0 is 0 and the sign signal is 1, then the output is 1 and the polarity of D0 is changed. The circuit 241 further includes a first AND gate that takes two consecutive clock signals as inputs, where the two consecutive clock signals determine a position in which the 4-UI wide data may be carved. The results from the first AND gate and the XOR gate are inputted into a second AND gate to carve the corresponding 4-UI wide data into a 1-UI pulse positioned at a particular UI position.

The segment 220 may include or provide a pre-driver circuit 250 (a half circuit is shown in FIG. 2 for simplicity), which may include a 4:1 multiplexer operable to output one pulse among D0', D1', D2', D3' at each quarter of a clock cycle, or to output pulses D0', D1', D2', D3' as full-rate data. The pre-driver circuit 250 may act as a pre-driver to the driver 260 to minimize power consumption by the transmitter 100. In some examples, the pre-driver circuit 250 and the driver circuit 260 may be parts of a circuitry, such as an output circuit, that facilitates output of the pulses from the segment 220. In some examples, additional circuitry may be present between the outputs of the pulse generator 240 and inputs of the pre-driver circuit 250, where the additional circuitry may also be parts of the output circuit including the pre-driver circuit 250 and driver circuit 260. The pulses outputted from the pre-driver circuit 250 may be inputted into the driver circuit 260 of the segment 220, labeled as $D_{OUTp}$. The driver circuit 260 (a half circuit is shown in FIG. 2 for simplicity) may be connected to a bias voltage generator (described below) and may receive a voltage labeled as $V_{SEG<n>}$ from the bias voltage generator. The voltage $V_{SEG<n>}$ may be a voltage that adjusts a current, or a level of a current, of the corresponding segment, where the adjustment of the current may fine tune a tap weight of a tap assigned with the corresponding segment. The segment 220 may output the pulse $D_p$, which may be the pulse $D_{OUTp}$ with the weight given by voltage $V_{SEG<n>}$. The segment 220 may output a respective $D_p$, depending on the assignment of taps. For example, in a slice, if 8 segments are assigned as the main tap, then the 8 segments may output 8 $D_p$'s at substantially the same time. If 2 segments are assigned as a pre tap, then the 2 segments may output 2 $D_p$'s that occur one bit before the main cursor (the 8 $D_p$'s). If 2 segments are assigned to a post tap, then the 2 segments may output 2 $D_p$'s that are delayed one bit relative to the main cursor. Therefore, each slice among the slices 102 in the transmitter 100 may output a respective set of pulses, and may be combined (e.g., a sum) to form a reproduced version of the signal originally inputted into the serializer 104.

In summary, an incoming signal or data stream may be received at the serializer 104. The serializer 104 may serialize and partition the incoming signal into bit streams (e.g., plurality of pulses, or 2-level signals) and feed different bit streams into different slices 102. Each slice 102 may receive a respective bit stream, and may process the methods described above to implement feed forward equalization on the respective bit stream. The slices 102 may output reproduced bit streams, and the outputted bit streams may be combined to form an output signal that may be a reproduced version of the incoming signal.

Since all segments remain active with different tap weights and configurations, constant peak power may be maintained, which may lead to efficient use of transistor sizing without excess parasitic. Further, the current of each segment can be adjusted with the $V_{SEG}$ gate voltage in the driver circuit 260, which may be generated by an op-amp-based replica bias circuit (described below). In the pre-driver circuit 250, the PFET gate voltage $V_{CTRL}$ may be biased to maintain optimum performance over process voltage temperature (PVT). Current saturation of the PFET with large VDS reduces the static power dissipation compared to a pullup resistor for a given settling time. The pre-driver circuit 250 and the driver circuit 260 may be sized to generate 20 mA of drive current with the lowest parasitics while obeying EM current limitations.

Figure 3:
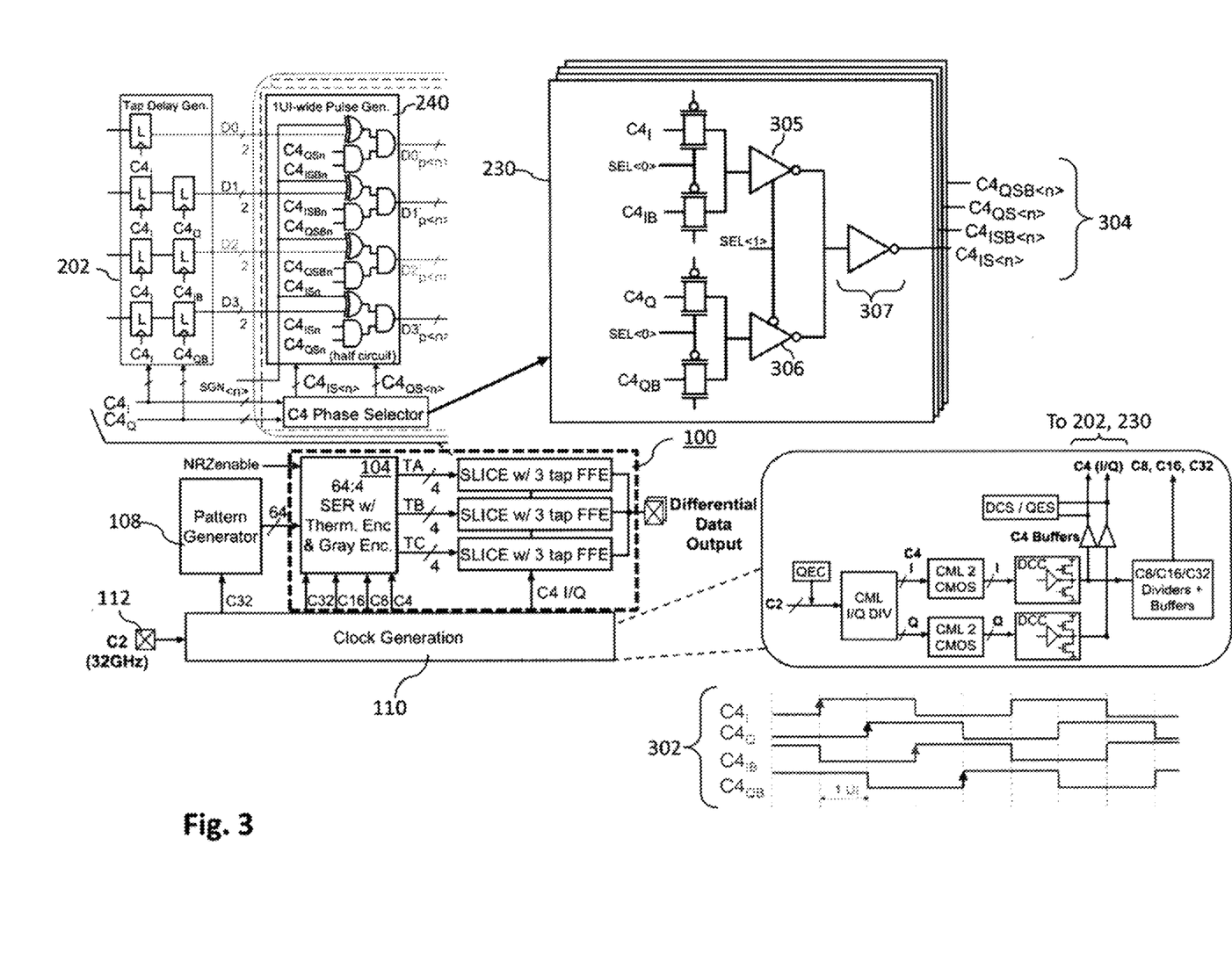
FIG. 3 is a block diagram illustrating additional details of a transmitter with fully re-assignable segments for reconfigurable FFE taps in one embodiment.

FIG. 3 is a block diagram illustrating additional details of a transmitter with fully re-assignable segments for reconfigurable FFE taps in one embodiment. FIG. 3 may include components that are labeled identically to components of FIGS. 1-2, which will not be described again for the purposes of clarity. The description of FIG. 3 may reference at least some of the components of FIGS. 1-2.

In an example shown in FIG. 3, the clock generator 110 may generate clock signals C4, which includes $C4_I$, $C4_Q$, where clock C4 may be quarter rate clock signals such that a clock cycle of the $C4_I$, $C4_Q$, signals spans four UIs, allowing transmission of 4 UIs of signals or pulses in a clock cycle. Clock signals $C4_I$, $C4_Q$ may be 90 degrees out of phase from each other. The clock signal $C4_I$ may be a clock signal that is in-phase, and the clock signal $C4_Q$ may be a quadrature clock signal that is 90 degrees out of phase from $C4_I$. In an example, the clock generator 110 may receive the clock input 112 that may be a half-rate 32 GHz clock signal. The clock input 112 may be inputted into a current mode logic (CML) I/Q divider to frequency divide the clock input 112 into clock signals labeled as C4, which may be four-phase quad-rate CML clock signals. The I clock signal and the Q clock signal among the C4 clock signals may be inputted into a respective CML-to-CMOS converter to distribute the clock signals C4 with reduced jitter and clocking power. After conversion to CMOS logic levels, the $C4_I$ clock is divided to generate C8, C16 and C32 clock signals. For a high-speed quarter-rate transmitter, timing accuracy of the quarter rate clocks may be critical. Quadrature error sensing (QES) and duty cycle error sensing (DCS) are based on measurement of average voltages generated by an XOR-based mixer and LPF for QES and only an LPF for DCS. Positive or negative current injection may be used to perform duty-cycle correction (DCC) in both quarter-rate clock paths $C4_I$ and $C4_Q$; sub-100 fs DCC resolution may be achieved using 6b current digital-to-analog converters (IDACs). Quadrature-error correction (QEC) is done by adding a differential voltage offset to the half-rate input clock signal 112.

The C32 clock signals may be sent to the pattern generator 108, to drive the data generation being performed by the pattern generator 108 if pattern generator 108 is connected to the transmitter 100. The C4, C8, C16, C32 clock signals may be sent to the serializer 104 to drive the operations being performed by the serializer 104. The C4 clock signals, including the $C4_I$ and $C4_Q$ clock signals, may be inputted into the delay generator 202 and the phase selector 230. The $C4_I$ and $C4_Q$ clock signals may be two baseband signals (in-phase and quadrature) that are orthogonal to each other (90 degrees out of phase) with the same amplitude.

The phase selector 230 may receive the $C4_I$ and $C4_Q$ clock signals. The phase selector 230 may also receive a selection signal labeled as SEL<0:1>, which may be a two-bit signal. The selection signal may determine a selection of a clock signal among clock signals $C4_I$, $C4_Q$ and corresponding complementary clock signals $C4_{IB}$ and $C4_{QB}$. $C4_{IB}$ may be 90 degrees out of phase with $C4_Q$ and may be 180 degrees out of phase with $C4_I$. $C4_{QB}$ may be 90 degrees out of phase with $C4_{IB}$ and may be 180 degrees out of phase with $C4_Q$. The clock signals $C4_I$, $C4_Q$, $C4_{IB}$, $C4_{QB}$ may be transmitted via respective transmission gates of the phase selector 230. A transmission gate of the phase selector 230 may be activated by a respective combination of bits in the selection signal SEL <0:1>. For example, if SEL<0> is '0' and SEL<1> is '0' (SEL="00"), then a tri-state inverter 306 may be activated, and the transmission gates corresponding to $C4_{IB}$ and $C4_{QB}$ may be activated. Since SEL<1> is '0', the tri-state inverter 305 may remain deactivated and the clock signal $C4_{IB}$ may not be propagated through the tri-state inverter 305. However, the tri-state inverter 306 is activated and thus, the clock signal $C4_{QB}$ may be propagated through the tri-state inverter 306, whose output may be inverted by an inverter 307, and outputted as a selected clock signal $C4_{IS<n>}$, or $C4_{IS}$, where n is an index of the corresponding segment. The selected clock signals $C4_{IS}$ ($C4I_{seg}$ or $C4_{IS<n>}$ or $C4_{ISn}$), $C4_{QS}$ ($C4Q_{seg}$ or $C4_{QS<n>}$ or $C4_{QSn}$), and their corresponding complementary clock signals $C4_{IBS}$ ($C4IB_{seg}$ or $C4_{ISB<n>}$ or $C4_{ISBn}$), $C4_{QBS}$ ($C4QB_{seg}$ or $C4_{QSB<n>}$ or $C4_{QSBn}$), may be collectively labeled as selected clock signals 304, and may be out of phase with each other. $C4_{ms}$ may be 90 degrees out of phase with $C4_{QS}$ and may be 180 degrees out of phase with $C4_{IS}$. $C4_{QBs}$ may be 90 degrees out of phase with $C4_{ms}$ and may be 180 degrees out of phase with $C4_{Qs}$. In the example shown in FIG. 3, the phase selector 230 may include or provide four slices of circuitry operable to output respective selected clock signals 304. In some examples, the phase selector 230 may be a 4:4 MUX, such that the phase selector 230 may output the four selected clock signals 304 from the four input clock signals $C4_I$, $C4_Q$, $C4_{IB}$, $C4_{QB}$ based on the selection signal SEL<0:1>. Further details of the selected clock phases 304 will be provided below.

Figure 4:
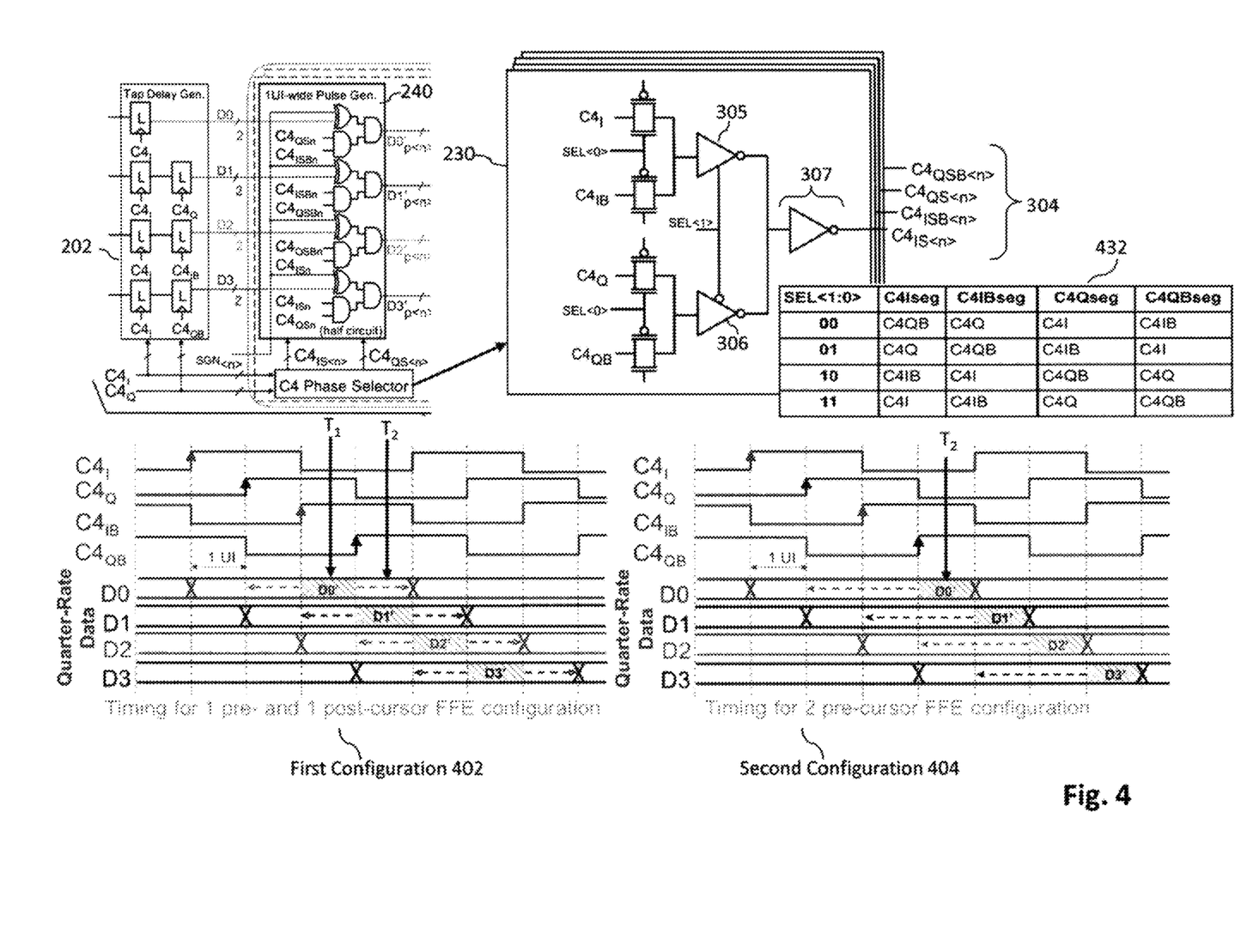
FIG. 4 illustrates a timing diagram of an implementation of a transmitter with fully re-assignable segments for reconfigurable FFE taps in one embodiment.

FIG. 4 illustrates a timing diagram of an implementation of a transmitter with fully re-assignable segments for reconfigurable FFE taps in one embodiment. FIG. 4 may include components that are labeled identically to components of FIGS. 1-3, which will not be described again for the purposes of clarity. The description of FIG. 4 may reference at least some of the components of FIGS. 1-3.

In an example shown in FIG. 4, the pulse generator 240 may carve the 1-UI pulses D0', D1', D2', D3' at specific UI positions based on selected clock phases 304 received from the phase selector 230. In a first configuration 402, the 1-UI pulses are carved at a third UI among the four UIs of the staggered data streams D0, D1, D2, D3. By carving the staggered data streams at the third UI, the corresponding segment may be configured as a main FFE tap, and other segments in the same slice may carve the same staggered data streams D0, D1, D2, D3 at the first, second, or fourth UIs to configure pre and post FFE taps. In the first configuration 402, the pulse generator 240 may carve the 1-UI pulse D0' at the third UI when initiated by $C4_{IB}$ (when $C4_{IB}$ turns high) and terminated by $C4_Q$ (when $C4_Q$ turns low). Another segment in the same slice may be reconfigured as a pre- or post-cursor by changing the C4 clock phase selection to shift the carving left or right (as shown by the dashed arrows). In a second configuration 404, the 1-UI pulses are carved at a fourth UI among the four UIs of the staggered data streams D0, D1, D2, D3. By carving the staggered data streams at the fourth UI, the corresponding segment may be configured as a main FFE tap, and other segments of the same slice may carve the same staggered data streams D0, D1, D2, D3 at the first, second, or third UIs to configure pre FFE taps. In the second configuration 404, the pulse generator 240 may carve the 1-UI pulse D0' at the fourth UI when initiated by $C4_{QB}$ (when $C4_{QB}$ turns high) and terminated by $C4_{IB}$ (when $C4_{IB}$ turns low). Another segment in the same slice may be reconfigured as a pre-cursor by changing the C4 clock phase selection to shift the carving left (as shown by the dashed arrows). The first configuration 402 and the second configuration 404 are based on different selected clock phases received from the phase selector 230. Thus, the carving position of the pulses may be shifted along time to reassign different segments to different FFE taps.

The carving position may be based on the selected clock phases 304 outputted by the phase selector 230. A truth table 432, shown in FIG. 4, specifies the different clock signals that may be outputted as selected clock phases 304 in accordance with the selection signal SEL<0:1>. For example, referring to an example above, when SEL<0:1> is "00", clock signal $C4_{QB}$ is outputted as selected clock signal $C4_{IS}$, and clock signals $C4_Q$, $C4_I$, $C4_{IB}$ are outputted as selected clock signals $C4_{IBS}$, $C4_{QS}$, $C4_{QBS}$, respectively. In another example, focusing on the first configuration 402, at time $T_1$ (or a UI corresponding to $T_1$), the clock signals $C4_{IB}$ and $C4_Q$ are high, and the clock signals $C4_I$ and $C4_{QB}$ are low. If SEL<0:1> is "11" (first configuration 402), the selected clock signals $C4_{ISB}$ and $C4_{QS}$ may be high because $C4_{IB}$ and $C4_Q$ are high (according to the truth table 432). Focusing on the pulse generator 240, the selected clock signals $C4_{ISB}$ and $C4_{QS}$ being high may cause D0' to be outputted from the pulse generator 240, while other pulses D1', D2', D3' may not be outputted by the pulse generator 240. As time proceeds to time T2, the clock signals $C4_{IB}$ and $C4_{QB}$ are high, and the clock signals $C4_I$ and $C4_Q$ are low. Due to SEL<0:1> being "11", the selected clock signals $C4_{ISB}$ and $C4_{QSB}$ may be high because $C4_{IB}$ and $C4_{QB}$ are high (according to the truth table 432). Thus, the selected clock signals $C4_{ISB}$ and $C4_{QSB}$ being high may cause D1' to be outputted from the pulse generator 240, while other pulses D0', D2', D3' may not be outputted by the pulse generator 240. Thus, the pulses D0', D1', D2', D3' may be carved and positioned at specific UI positions according to the selection signal SEL<0:1> and the selected clock phases 304 output by the phase selector 230.

In the second configuration 404, the selection signal SEL<0:1> is "01". At time $T_2$, the clock signals $C4_{IB}$ and $C4_{QB}$ are high, and the clock signals $C4_I$ and $C4_Q$ are low. Due to SEL<0:1> being "01", the selected clock signals $C4_{ISB}$ and $C4_{QS}$ may be high because $C4_{IB}$ and $C4_{QB}$ are high (according to the truth table 432). Thus, the selected clock signals $C4_{ISB}$ and $C4_{QS}$ being high may cause D0' to be outputted from the pulse generator 240 at the fourth UI, while other pulses D1', D2', D3' may not be outputted by the pulse generator 240 at $T_2$. Therefore, a change in the selection signal SEL<0:1> may cause a shift of the carving position to carve the staggered data streams D0, D1, D2, D3.

Figure 5:
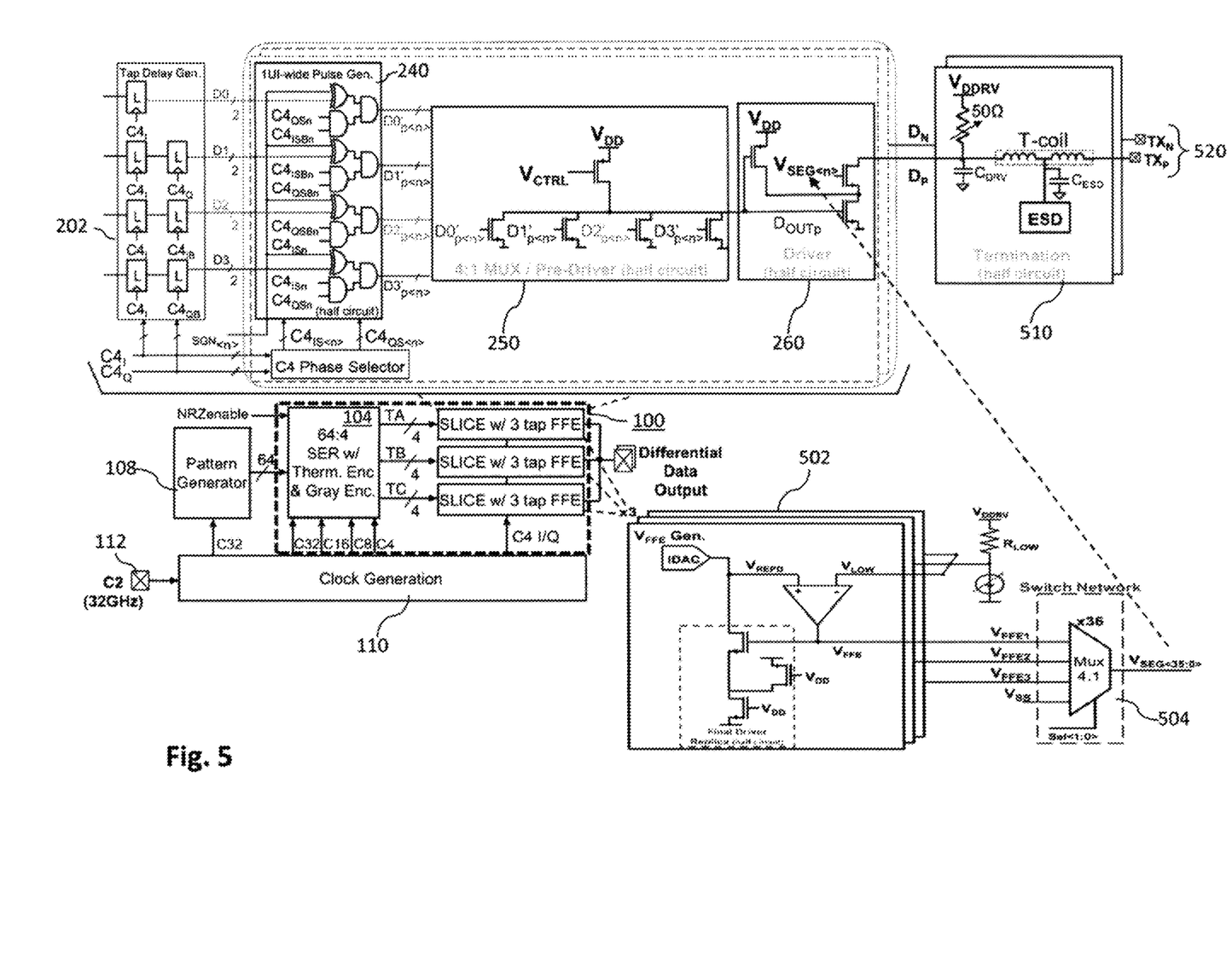
FIG. 5 is a block diagram illustrating additional details of a transmitter with fully re-assignable segments for reconfigurable FFE taps in one embodiment.

FIG. 5 is a block diagram illustrating additional details of a transmitter with fully re-assignable segments for reconfigurable FFE taps in one embodiment. FIG. 5 may include components that are labeled identically to components of FIGS. 1-4, which will not be described again for the purposes of clarity. The description of FIG. 5 may reference at least some of the components of FIGS. 1-4.

In an example shown in FIG. 5, a slice 102 may include or provide a bias voltage generator 502 operable to adjust or refine tap weights of the segments among the slice. The bias voltage generator 502 may output bias voltage of different voltage levels, labeled as $V_{FFE1}$, $V_{FFE2}$, $V_{FFE3}$, to a switch network 504. The switch network 504 may include thirty-six 4:1 analog MUXes and may be a part of the transmitter 100. In the example shown in FIG. 5, the three voltages $V_{FFE1}$, $V_{FFE2}$, $V_{FFE3}$, may correspond to the three FFE taps (pre, main, post), and may be distributed to all the segments with the switch network 504. The bias voltage generator 502 may include a current digital-to-analog converter (IDAC), where the IDAC may be tuned to change current being applied to the bias voltage generator 502 to tune a tap weight of corresponding segments in a slice. For example, an op-amp may control the bias voltage generator 502 to set the drain current to a digitally programmable value. The switch network 504 may receive voltages $V_{FFE1}$, $V_{FFE2}$, $V_{FFE3}$ based on the adjusted current, and may distribute $V_{FFE1}$, $V_{FFE2}$, $V_{FFE3}$ into the thirty-six 4:1 MUXes. The thirty-six 4:1 MUXes may output $V_{SEG<35:0>}$ corresponding to 36 segments (12 in each slice) of the transmitter 100. The switch network 504 may further distribute $V_{SEG<n>}$ to the driver circuit 260 of a corresponding n segments. The voltage $V_{SEG<n>}$ received at the driver circuit 260 may fine tune a tap weight for a tap being assigned with the corresponding segment, resulting in an output pulse $D_p$. As such, the drive current of each segment in the slice 102 may be fine-tuned to achieve a required tap weight resolution, and combination of coarse-fine tuning of tap weights may be provided by the transmitter 100. The bias voltage generator 502 may be further operable to automatically adjust the gate voltage to determine an appropriate gate voltage to maintain power efficiency. In some examples, the coarse tap weight setting is defined as the number of segments assigned to a given FFE cursor or tap out of the N segments available (N=36 for NRZ, 12 for PAM-4 modes).

The transmitter 100 may further include a termination circuit 510 operable to prevent signals outputted from the segments from undesired reflections and distortions. The outputs with applied weights, $D_p$, of the segment of a slice may be outputted to the terminator circuit 510 to output an output data stream 520 outside of the transmitter 100 (e.g., to a communication channel). The termination circuit uses a 2-segment inductor (T-coil) to minimize bandwidth return loss degradation when an ESD device (1 kV HBM, 250V CDM, 30V MM) is added. The T-coil may absorb the parasitic capacitance associated with the driver circuit 260 and electrostatic discharge (ESD). The two inductors connected in series are magnetically coupled to each other (forming a transformer) and may be used to tune out (compensate) the capacitive impedances associated with the driver circuit 260 that may be stored in capacitors $C_{DRV}$, and capacitance associated with ESD stored in $C_{ESD}$.

Accordingly, a transmission system architecture described in accordance with the present disclosure may be implemented in a transmitter or a transmission portion of a transceiver to facilitate output of a data stream. The architecture described in accordance with the present disclosure implements feed forward equalization on an incoming data stream to prepare the data stream for transmission through a communication channel. Further, the architecture described in accordance with the present disclosure provides a reconfigurable segment feature that may improve device sizing and efficiency by reallocating segments to different FFE taps without requiring changes to existing hardware. Further, the architecture described in accordance with the present disclosure provides a flexibility in assigning different coarse tap weights to different FFE taps without additional hardware.

Figure 6:
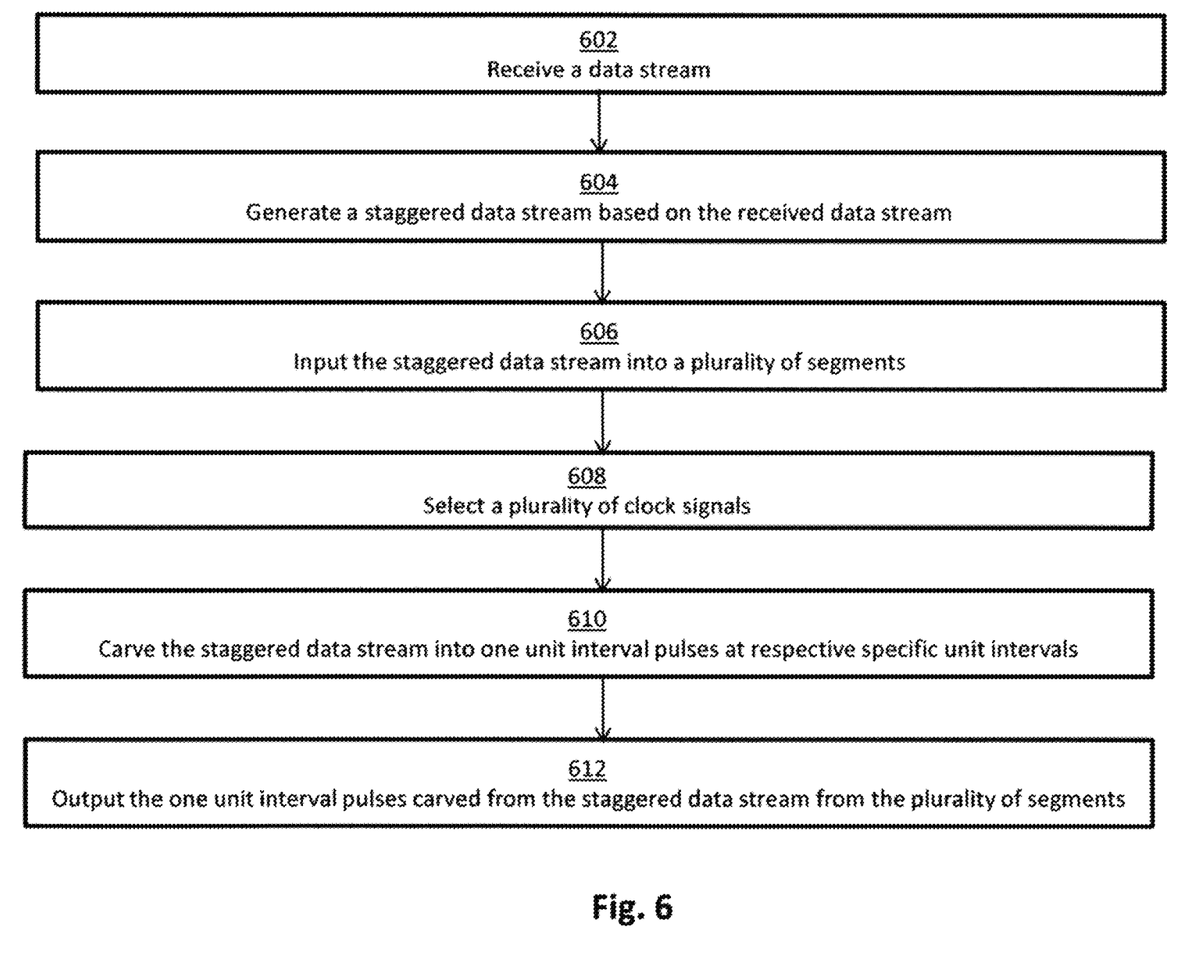
FIG. 6 illustrates a flow diagram relating to a process to implement a transmitter with fully re-assignable segments for reconfigurable FFE taps in one embodiment.

FIG. 6 illustrates a flow diagram relating to a process to implement a transmitter with fully re-assignable segments for reconfigurable FFE taps, arranged in accordance with at least some embodiments presented herein. The process in FIG. 6 may be implemented using, for example, system 100 discussed above. An example process may include one or more operations, actions, or functions as illustrated by one or more of blocks 602, 604, 606, 608, 610, and/or 612. Although illustrated as discrete blocks, various blocks may be divided into additional blocks, combined into fewer blocks, eliminated, or performed in parallel, depending on the desired implementation.

Processing may begin at block 602, where a data transmission system receives a data stream. Processing may continue from block 602 to block 604, where the transmission system generates a staggered data stream based in the received data stream. The staggered data stream includes data of the data stream in staggered unit intervals. Processing may continue from block 604 to block 606, where the transmission system inputs the staggered data stream into a plurality of segments. Processing may continue from block 606 to block 608, where the transmission system selects a plurality of clock signals. Processing may continue from block 608 to block 610, where the transmission system carves the staggered data stream into one unit interval pulses at respective specific unit intervals. The specific unit interval to carve the staggered data stream indicates an assignment of the corresponding segment as one of a feed forward equalization (FFE) pre tap, a FFE main tap, and a FFE post tap. The specific unit interval to carve the staggered data stream is based on the selected clock signals. Processing may continue from block 610 to block 612, where the transmission system outputs the one unit interval pulses carved from the staggered data stream from the plurality of segments.

In some examples, the processing may include additional operations. For example, the data transmission system may adjust a current of a bias voltage generator to generate bias voltages, tune a tap weight of the corresponding segment based on the bias voltages, and output the one unit interval pulses with the tuned tap weights.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A circuitry comprising:
   a delay generator operable to:
      receive a data stream;
      generate a staggered data stream based on the received data stream, wherein data among the staggered data stream are positioned at staggered unit intervals;
   a plurality of segments coupled to the delay generator, a segment provides:
      a pulse generator operable to:
         receive the staggered data stream from the delay generator;
         perform AND operations on the staggered data stream with respective pair of clock signals of different phases to carve the staggered data stream into one unit interval pulses at a specific unit interval, wherein the specific unit interval indicates an assignment of a corresponding segment of the plurality of segments as one of a feed forward equalization (FFE) pre tap, a FFE main tap, and a FFE post tap;
a phase selector coupled to the pulse generator, the phase selector operable to define the specific unit interval; and
an output circuit operable to output the one unit interval pulses carved from the staggered data stream in accordance with the specific unit interval.

2. The circuitry of claim 1, wherein the delay generator and the plurality of segments are parts of a slice, the slice being among a plurality of slices of a data transmission system, and wherein:
the received data stream is a portion of an input data stream received by the data transmission system; and
the one unit interval pulses outputted from the plurality of segments are combined with one unit interval pulses outputted from other slices among the plurality of slices to form a reproduced version of the input data stream.

3. The circuitry of claim 1, wherein the pulse generator comprises a plurality of AND gates operable to perform the AND operations, and, wherein the pair of clock signals define the specific unit interval.

4. The circuitry of claim 3, wherein the phase selector is operable to select the pair of clock signals.

5. The circuitry of claim 1, wherein the phase selector is operable to:
receive a plurality of incoming clock signals;
receive a selection signal; and
output the respective pair of clock signals based on the selection signal, wherein the pair of clock signals define the specific unit interval.

6. The circuitry of claim 1, wherein the pulse generator of the segment is operable to receive a signal to change a polarity of the staggered data stream.

7. The circuitry of claim 1, wherein:
a first number of segments among the plurality of segments is assigned as the FFE pre tap corresponding to at least one pre-cursor of the outputted one unit interval pulses, and a number of segments assigned to the FFE pre tap corresponds to a coarse weight setting of a corresponding pre-cursor of the outputted one unit interval pulses;
a second number of segments among the plurality of segments is assigned as the FFE main tap corresponding to a main-cursor of the outputted one unit interval pulses, and the second number corresponds to a coarse weight setting of the main-cursor of the outputted one unit interval pulses; and
a third number of segments among the plurality of segments is assigned as the FFE post tap corresponding to at least one post-cursor of the outputted one unit interval pulses, and a number of segments assigned to the FFE post tap corresponds to a coarse weight setting of a corresponding post-cursor of the outputted one unit interval pulses.

8. The circuitry of claim 7, wherein the first number of segments assigned as the FFE pre tap is different from the third number of segments assigned as the FFE post tap.

9. The circuitry of claim 1, wherein the assignment of the plurality of segments to the FFE pre tap, the FFE main tap, and the FFE post tap is reconfigurable based on changes to the specific unit interval.

10. The circuitry of claim 1, wherein the output circuit is operable to:
receive bias voltages from a bias voltage generator coupled to the output circuit;
adjust a current of the corresponding segment based on the bias voltages to tune a tap weight of the corresponding segment; and
output the one unit interval pulses with the tuned tap weights.

11. A data transmission system comprising:
a clock generator operable to generate a plurality of clock signals of different phases;
a circuitry that provides:
a delay generator coupled to the clock generator, the delay generator operable to:
receive a data stream;
generate a staggered data stream based on the received data stream, wherein data among the staggered data stream are positioned at staggered unit intervals;
a plurality of segments coupled to the delay generator, a segment provides:
a pulse generator operable to:
receive the staggered data stream from the delay generator;
perform AND operations on the staggered data stream with a selected pair of clock signals among the plurality of clock signals to carve the staggered data stream into one unit interval pulses at a specific unit interval, wherein the specific unit interval indicates an assignment of a corresponding segment of the plurality of segments as one of a feed forward equalization (FFE) pre tap, a FFE main tap, and a FFE post tap;
a phase selector coupled to the clock generator and the pulse generator, the phase selector is operable to select a pair of clock signals generated by the clock generator to define the specific unit interval; and
an output circuit operable to output the one unit interval pulses carved from the staggered data stream in accordance with the specific unit interval.

12. The data transmission system of claim 11, further comprises a plurality of slices, wherein:
the circuitry is part of a slice among the plurality of slices;
the received data stream is a portion of an input data stream received by the data transmission system; and
the one unit interval pulses outputted from the plurality of segments of the circuitry are combined with one unit interval pulses outputted from other slices among the plurality of slices to form a reproduced version of the input data stream.

13. The data transmission system of claim 11, wherein the phase selector is operable to:
receive a plurality of incoming clock signals;
receive a selection signal; and
output the pair of selected clock signals based on the selection signal, wherein the pair of clock signals define the specific unit interval.

14. The data transmission system of claim 11, wherein the pulse generator of the segment is operable to receive a signal to change a polarity of the staggered data stream.

15. The data transmission system of claim 11, wherein:
a first number of segments among the plurality of segments is assigned as the FFE pre tap corresponding to at least one pre-cursor of the outputted one unit interval pulses, and a number of segments assigned to the FFE pre tap corresponds to a coarse weight setting of a corresponding pre-cursor of the outputted one unit interval pulses;

a second number of segments among the plurality of segments is assigned as the FFE main tap corresponding to a main-cursor of the outputted one unit interval pulses, and the second number corresponds to a coarse weight setting of the main-cursor of the outputted one unit interval pulses; and a third number of segments among the plurality of segments is assigned as the FFE post tap corresponding to at least one post-cursor of the outputted one unit interval pulses, and a number of segments assigned to the FFE post tap corresponds to a coarse weight setting of a corresponding post-cursor of the outputted one unit interval pulses.

16. The data transmission system of claim 15, wherein the first number of segments assigned as the FFE pre tap is different from the third number of segments assigned as the FFE post tap.

17. The data transmission system of claim 11, wherein the assignment of the plurality of segments to the FFE pre tap, the FFE main tap, and the FFE post tap is reconfigurable based on changes to the specific unit interval.

18. The data transmission system of claim 11, further comprises a bias voltage generator coupled to the output circuit, the bias voltage generator being operable to:

adjust a current to generate bias voltages;

send the bias voltages to the output circuit;

wherein the output circuit is operable to:

receive the bias voltages from the bias voltage generator;

adjust a current of the corresponding segment based on the bias voltages to tune a tap weight of the corresponding segment; and output the one unit interval pulses with the tuned tap weights.

19. A method of performing feed forward equalization on a data stream, the method comprising:

receiving a data stream;

generating a staggered data stream based in the received data stream, wherein data among the staggered data stream are positioned at staggered unit intervals;

inputting the staggered data stream into a plurality of segments;

selecting a plurality of clock signals;

performing AND operations on the staggered data stream with the selected clock signals to carve the staggered data stream into one unit interval pulses at respective specific unit intervals, wherein the specific unit interval to carve the staggered data stream indicates an assignment of a corresponding segment of the plurality of segments as one of a feed forward equalization (FFE) pre tap, a FFE main tap, and a FFE post tap, and the specific unit interval to carve the staggered data stream is based on the selected clock signals;

outputting the one unit interval pulses carved from the staggered data stream from the plurality of segments.

20. The method of claim 19, further comprising:

generating bias voltages;

adjusting a current of the corresponding segment based on the bias voltages to tune a tap weight of the corresponding segment; and outputting the one unit interval pulses with the tuned tap weights.

* * * * *